Patented Oct. 14, 1947

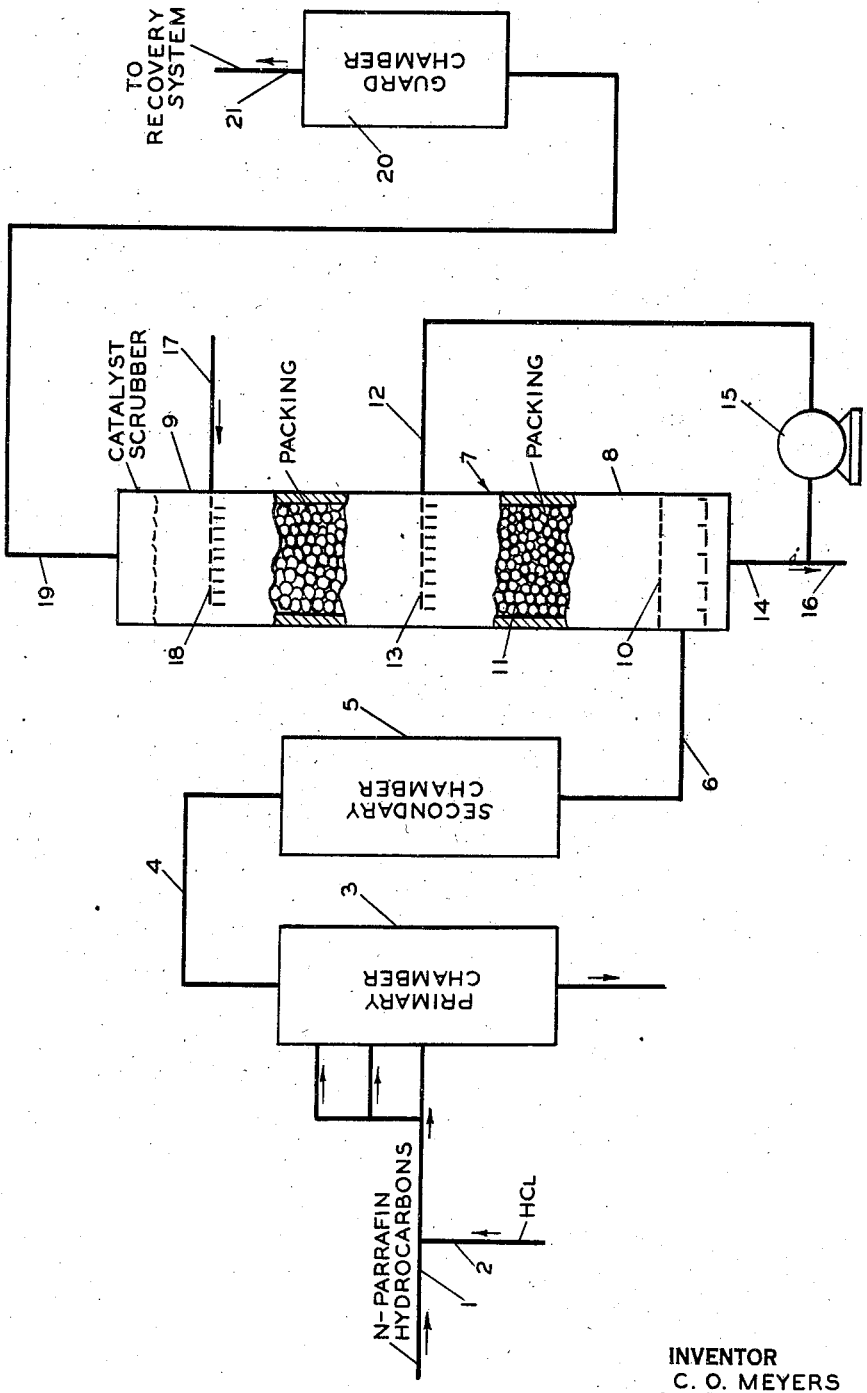

2,428,981

UNITED STATES PATENT OFFICE 2,428,981

METHOD FOR REMOVING METAL HALIDE VAPORS FROM A HYDROCARBON REACTION PRODUCT

Charles O. Meyers, Bartlesville, Okla., assignor to Phillips Petroleum Company, a corporation of Delaware Application March 20, 1944, Serial No. 527,265

8 Claims. (Cl. 260—683.5)

This invention relates to a process for the conversion of low boiling hydrocarbons with volatilizable Friedel-Crafts type metal halide catalysts wherein a stream of the low boiling hydrocarbons is passed into contact with such a catalyst under conditions effecting the desired conversion and such that some of said metal halide catalyst is incorporated in the effluent stream which may be either liquid or gaseous, more usually the latter. More particularly, it relates to a process of the foregoing type for the isomerization of normal paraffins to isoparaffins by means of a volatilizable aluminum halide as a catalyst in the presence of a hydrogen halide as a promoter and wherein the isomerization effluent is commonly vaporous although it may be liquid in rare instances. The aluminum halide is usually aluminum chloride although aluminum bromide may less preferably be employed. Generally the hydrogen halide corresponds to the aluminum halide and is almost invariably anhydrous.

The present invention relates to a method of removing the volatilized metal halide catalyst from vaporous conversion effluents of the foregoing type, or of dissolved metal halide catalyst from liquid conversion effluents of the foregoing type in the relatively uncommon situation where the effluent is liquid. The presence of volatilizable metal halide in effluents of this type is very undesirable inasmuch as it promotes corrosion and erosion of the equipment, causes plugging of the equipment and numerous other difficulties. Various schemes have been proposed in the past for removal of dissolved or volatilized catalysts but for a number of reasons none of them has been commonly adopted so far as I am aware.

In the copending applications of Hachmuth and Blaker, Serial No. 460,702, filed October 3, 1942, and of Hachmuth, Serial No. 460,703, filed on the same date, now U. S. Patent No. 2,396,173, there is disclosed the idea of removing volatilized aluminum chloride from an isomerization effluent by scrubbing with aluminum chloride sludge which may be formed by reaction of the aluminum chloride with an unsaturated hydrocarbon such as a liquid olefinic polymer. In some aspects, the present invention may be considered to be an improvement over the processes disclosed in these copending applications and reference may be had thereto for a more detailed understanding of the background of the present invention.

The principal object of the present invention is to provide an improved process for removing a volatilizable metal halide, especially an aluminum halide, from hydrocarbon conversion effluents containing the same. Another object is to effect the more complete removal of such metal halide from such effluents. Another object is to effect such removal with the effluent in the vapor phase. Another object is to effect such removal without affecting the hydrocarbon or hydrogen halide content of the effluent being treated. Numerous other objects will more fully hereinafter appear.

The accompanying drawing portrays diagrammatically one arrangement of equipment which may be used in carrying out the present invention. It will be understood that the reactor may take any form and does not constitute per se any part of the present invention.

My invention may perhaps be best understood by a description of a typical application thereof to the isomerization of paraffin hydrocarbons of four to six carbon atoms per molecule. In such isomerization, dry and slightly superheated vapors of such paraffins together with anhydrous hydrogen chloride vapor may be passed into the bottom of a primary chamber containing an aluminum chloride complex olefinic polymer sludge or only aluminum chloride sludge in the bottom section, and then through a bed or beds of aluminum chloride. The initial contact of the feed with the sludge removes olefins, moisture, and other sludge-forming materials which may be present in the feed, and it also removes catalyst poisons from the anhydrous hydrogen chloride. The vapor then passes through the upper part of the primary chamber which contains a bed or beds of aluminum chloride. If desired, fluids may be introduced at a multitude of points in the stream or in the chamber to control the temperature and/or the reaction, as is disclosed in the copending application of Hachmuth, Serial No. 460,876, filed October 5, 1942.

The effluent from the primary chamber or chambers may be passed through a secondary chamber or chambers containing bauxite (preferably in that form known to the trade as "Porocel"), fuller's earth or some other supporting material. The treatment in the secondary chamber or chambers serves the dual purpose of removing sublimed aluminum chloride catalyst in the effluent vapors and also increasing the conversion of straight chain hydrocarbons to branched chain hydrocarbons by the catalytic effect of the aluminum chloride catalyst removed from the effluent. In fact, the extent or degree of conversion in the secondary chamber is often much greater than that in the primary chamber so that it is often desirable to dispense with the primary chamber.

The effluent from the secondary chamber contains volatilized aluminum chloride as well as the normal paraffin and isoparaffin, the hydrogen chloride, and any hydrogen, light hydrocarbons, and heavier hydrocarbons formed in the isomerization. In accordance with the present invention, the aluminum chloride content thereof is removed therefrom in the following manner. This vaporous effluent is passed directly into the bottom of a catalyst scrubber which is preferably vertical. The bottom of the catalyst scrubber contains an aluminum chloride complex olefinic polymer sludge. A portion of the scrubber above this sludge is filled with Raschig rings or some other contacting material. It may be desirable to leave space above the packing material for any entrained liquid to settle out of the escaping vapors. An aluminum chloride complex olefinic polymer sludge is continually pumped from the bottom of the scrubber into an intermediate point of the section of the tower which contains the Raschig rings so as to wet a complete cross-section of the Raschig rings and drain down over the rings countercurrently to the upward flow of vapors in the scrubber.

As the olefinic polymer sludge becomes spent by absorbing or reacting with the sublimed aluminum chloride it is withdrawn from the catalyst scrubber and additional fresh olefinic polymer is pumped into the scrubber at a point well above that at which the recirculated sludge is introduced. This fresh olefinic polymer maintains the Raschig rings above the point of introduction of recycled sludge in a wetted condition so that the vapors are given a final scrubbing with fresh polymer whereby any traces of volatilized aluminum chloride are removed therefrom before they leave the scrubber. The fresh olefinic polymer may be added at the top of or above the top of the Raschig rings and serves to trap or absorb or react with any sublimed aluminum chloride which may be in the hydrocarbon vapors. The effluent from the catalyst scrubber is completely free of aluminum chloride and may be passed directly to the conventional recovery system wherein there are separated a stream of recycle hydrogen chloride, a stream of product isoparaffins and a stream of recycled normal paraffins. If desired, the effluent from the scrubber may first be passed into a guard chamber filled with an absorbing agent such as bauxite or "Porocel." This guard chamber serves only as a safety measure. If something should go wrong with the operation of the catalyst scrubber and allow sublimed aluminum chloride vapors to pass out of the top with the hydrocarbon vapors, such a guard chamber would function to remove the aluminum chloride and keep it out of the remainder of the system.

Referring to the drawing, normal paraffin feed enters via line 1 and, after admixture with a suitable proportion of hydrogen chloride or other hydrogen halide introduced by line 2, is passed into primary reactor 3. The effluent from reactor 3 passes via line 4 into secondary reactor 5. The vaporous effluent from chamber 5 passes via line 6 into the bottom of scrubber 7. Scrubber 7 is composed of two sections, 8 and 9. Scrubber 7 further comprises a tray 10 which supports packing 11 of Raschig rings or the like, the packing extending over the major portion of the scrubber 7. In the lower portion 8 of scrubber 7, the effluent vapors are scrubbed countercurrently with recycled aluminum chloride and polymer sludge which is introduced via line 12 and spider 13. The liquid sludge is withdrawn via line 14 and recycled by means of pump 15 and line 12. A portion of the sludge is discarded as necessary via line 16 in order to prevent the sludge from accumulating to an excessive extent in scrubber 7. The liquid level of the sludge is kept substantially below spider 13. Fresh liquid olefinic polymer is continuously introduced into the upper portion 9 of the scrubber 7 by means of line 17 and spider 18. The scrubbed effluent free of aluminum chloride or other volatilizable metal halide, is withdrawn from the top via line 18 and, after passage through a guard chamber 20 if desired, is passed via line 21 to the recovery system.

It is preferred that the portion of sludge which is discarded be chemically equivalent in amount to the amount of fresh olefinic polymer introduced at the top of the scrubber. In other words, the discarded sludge should contain in chemically combined form or otherwise, an amount of olefinic polymer substantially equal to that continuously being introduced by line 17.

It is preferred that the scrubbing with fresh polymer should be so carried out that all traces of metal halide are removed from the effluent. Often, it is preferred that the length of the scrubbing tower between tray 10 and spider 13 be equal to the length between spider 13 and spider 18 or the top of packing 11 so that the fresh olefinic polymer intimately contacts the vaporous effluent for a period of time approximately equal to that for which the recycled sludge contacts the effluent.

It will be understood of course that as the fresh olefinic polymer descends in section 9, it is at least partially converted to sludge and joins with the recycled sludge introduced via line 12, being used in conjunction therewith in section 8 for the initial scrubbing.

*Example*

1000 barrels per day of a hydrocarbon feed consisting essentially of normal butane and 5% hydrogen chloride by volume were contacted with aluminum chloride to produce isobutane. The reaction was carried out in a reactor in which the pressure was 175 p. s. i. and the temperature 200° F. The effluent from the reactor passed through a secondary chamber which contained "Porocel" and wherein most of the aluminum chloride contained in the vapors was deposited on the "Porocel."

The vaporous effluent from the secondary chamber passed into a scrubber which was a tower 4 ft. in diameter and 30 ft. high. There was a tray 2½ ft. from the bottom of the tower on which Raschig rings were supported. The Raschig rings filled the portion of the tower above the tray. A liquid level of 6 ft. was maintained in the tower. This liquid was recirculated at a rate of 20 gal. per hour into a spider which was located 15 ft. from the bottom of the chamber. 2½ gal. per hour of olefinic polymer of approximately 0.8 specific gravity was fed into the tower at a point 25 ft. from the bottom of the scrubber. The entering butane-hydrogen chloride feed to the scrubber contained 0.1% aluminum chloride vapors by weight of hydrocarbons. The recycled fluid contained 23.0% aluminum chloride. The vaporous effluent leaving the scrubber was at a pressure of 165 p. s. i. and was free of aluminum chloride.

The present invention presents a number of advantages over prior art practice. Among these is the fact that every trace of metal halide is removed from the effluent being scrubbed. Another advantage is that the scrubbing liquid resulting from the final scrubbing with fresh polymer commingles with the recycled sludge and is ultimately recycled along therewith. Still another advantage is that the major portion of the metal halide is removed in the initial scrubbing with recirculated sludge. Numerous other advantages will be apparent to those skilled in the art.

The term "aluminum chloride complex olefinic polymer sludge" as used in this specification refers to a pumpable liquid sludge which is formed by incorporating a minor amount of aluminum chloride in an olefin polymer, some unsaturated linkages being present in the polymeric material. The term is used to distinguish this relatively inactive material from the active aluminum chloride-hydrocarbon complex catalysts widely used in alkylation and isomerization processes.

I claim:

1. In a process for conversion of low-boiling hydrocarbon with a volatilizable Friedel-Crafts type metal halide catalyst which comprises passing a stream of low-boiling hydrocarbon in contact with such a catalyst under conditions effecting the desired conversion and such that some of said metal halide catalyst becomes incorporated in the effluent stream, the improvement which comprises removing said metal halide from said effluent stream by intimately countercurrently contacting same in vapor phase in a first scrubbing zone with metal halide complex olefinic polymer sludge withdrawn from the bottom of said zone and re-introduced thereto and thereby causing the major part of said metal halide to be absorbed from said effluent stream by said sludge, then intimately countercurrently contacting the resulting effluent stream in vapor phase in a second scrubbing zone with fresh liquid olefinic polymer and thereby causing the remainder of said metal halide to be absorbed from said effluent stream by reaction with said fresh polymer, withdrawing the treated effluent stream free from metal halide from said second zone, and withdrawing from said second zone the resulting olefinic polymer and introducing same to said first zone and employing same therein in conjunction with said recirculated sludge for the first scrubbing step.

2. In the isomerization of normal paraffins to isoparaffins by means of a volatizable aluminum halide as a catalyst in the presence of a hydrogen halide as a promoter and wherein the isomerization effluent is vaporous and contains volatilized aluminum halide, the method of removing said volatilized aluminum halide from said vaporous effluent which comprises continuously introducing said effluent into a low point of a vertical scrubbing zone and passing same upwardly therein in intimate countercurrent contact first with aluminum halide complex olefinic polymer sludge withdrawn from the bottom of said zone and continuously introduced into an intermediate point of said zone and then with fresh olefinic polymer continuously introduced at a high point of said zone, continuously withdrawing aluminum halide complex olefinic polymer sludge from the bottom of said zone and introducing same continuously into said zone at an intermediate point thereof, continuously introducing fresh liquid olefinic polymer into said zone at a high point therein, and continuously withdrawing treated vaporous effluent free from aluminum chloride from the top of said zone.

3. The process of claim 2 wherein a portion of said withdrawn sludge is discarded from the system in amount chemically equivalent to that of said fresh olefinic polymer introduced into said zone.

4. In the isomerization of normal butane to isobutane by means of aluminum chloride as a catalyst in the presence of hydrogen chloride as a promoter and wherein the isomerization effluent is vaporous and contains volatilized aluminum chloride, the method of removing said volatilized aluminum chloride from said vaporous effluent which comprises continuously introducing said effluent into a low point of a vertical scrubbing zone and passing same upwardly therein in intimate countercurrent contact first with aluminum chloride complex olefinic polymer sludge withdrawn from the bottom of said zone and continuously introduced into an intermediate point of said zone and then with fresh olefinic polymer continuously introduced at a high point of said zone, continuously withdrawing aluminum chloride complex olefinic polymer sludge from the bottom of said zone and introducing same continuously into said zone at an intermediate point thereof, continuously introducing fresh liquid olefinic polymer into said zone at a high point therein, and continuously withdrawing treated vaporous effluent free from aluminum chloride from the top of said zone.

5. The process of claim 4 wherein a portion of said withdrawn sludge is discarded from the system in amount chemically equivalent to that of said fresh olefinic polymer introduced into said zone.

6. The process of claim 4 wherein said intermediate point is substantially the mid-point of said zone and wherein said fresh olefinic polymer contacts said vaporous effluent for a period of time equivalent to that for which the recirculated sludge contacts said effluent.

7. The process of claim 1 wherein a portion of the sludge withdrawn from the first zone is discarded from the system in amount chemically equivalent to the amount of fresh polymer introduced to the second zone whereby the sludge is kept from building up in the first zone.

8. The process of isomerizing normal butane to isobutane which comprises contacting a hydrocarbon feed consisting essentially of normal butane and 5 per cent hydrogen chloride by volume with aluminum chloride under conditions such as to effect isomerization of said normal butane to isobutane, passing the vaporous effluent through a secondary chamber to remove most of the aluminum chloride therefrom, passing the resulting vapors containing 0.1 per cent aluminum chloride by weight of hydrocarbons into the bottom of a packed vertical tower and countercurrently contacting same with recirculated aluminum chloride complex olefinic polymer sludge containing 23.0 per cent aluminum chloride, withdrawing said sludge from the bottom of said tower and re-introducing it into the mid-point thereof at the rate of 20 gallons per hour per 1000 barrels per day of said feed, continuously introducing fresh olefinic polymer into the top of said tower at the rate of 2½ gallons per hour per 1000 barrels per day of said feed and causing the vapors after they have traversed the bottom half of said tower to countercurrently contact said fresh olefinic polymer in the upper half of said tower, withdrawing the resulting vaporous effluent free of aluminum chloride from the top of said tower, and discarding a portion of the sludge withdrawn from the bottom of said tower from the system in amount chemically equivalent to the amount of said fresh polymer introduced into the top of said tower.

CHARLES O. MEYERS.

REFERENCES CITED

The following references are of record in the file of this patent:

UNITED STATES PATENTS

| Number | Name | Date |
|---|---|---|
| 1,578,049 | McAfee | Mar. 23, 1926 |
| 2,003,235 | Bennett | May 28, 1935 |
| 2,317,241 | Ackerman et al. | Apr. 20, 1943 |
| 2,356,190 | Voorhies | Aug. 22, 1944 |
| 2,342,123 | Danforth | Feb. 22, 1944 |
| 2,304,290 | Van Peski | Dec. 8, 1942 |
| 2,378,773 | Sensel | June 19, 1945 |
| 2,395,022 | Sutton et al. | Feb. 19, 1946 |
| 2,314,297 | Watson | Mar. 16, 1943 |
| 2,281,924 | deSimo et al. | May 5, 1942 |

Certificate of Correction

Patent No. 2,428,981.

October 14, 1947.

CHARLES O. MEYERS

It is hereby certified that errors appear in the printed specification of the above numbered patent requiring correction as follows: Column 5, line 62, claim 2, for "volatizable" read *volatilizable*; column 8, line 13, list of references cited, for the number "2,378,773", read *2,378,733*; and that the said Letters Patent should be read with these corrections therein that the same may conform to the record of the case in the Patent Office.

Signed and sealed this 20th day of January, A. D. 1948.

[SEAL]

THOMAS F. MURPHY,
*Assistant Commissioner of Patents.*